UNITED STATES PATENT OFFICE.

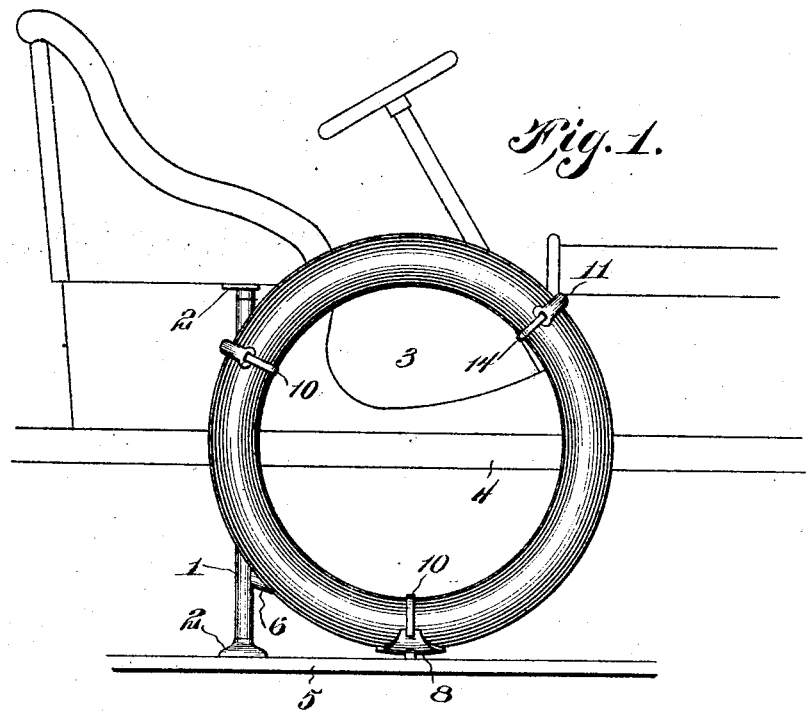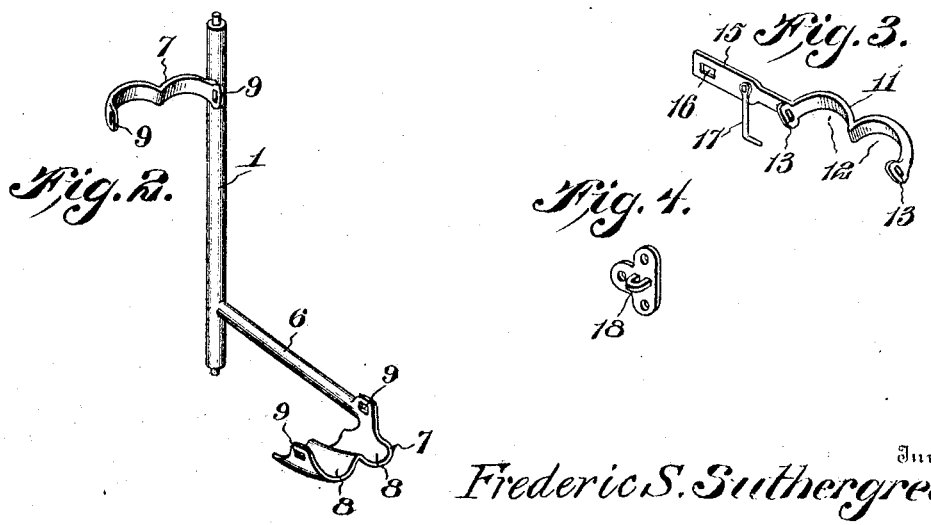

FREDERIC S. SUTHERGREEN, OF OSTERVILLE, MASSACHUSETTS.

TIRE-HOLDER FOR AUTOMOBILES.

No. 894,079.  
Specification of Letters Patent.  
Patented July 21, 1908.

Application filed May 16, 1907. Serial No. 374,001.

*To all whom it may concern:*

Be it known that I, FREDERIC S. SUTHERGREEN, a citizen of the United States, residing at Osterville, in the county of Barnstable and State of Massachusetts, have invented new and useful Improvements in Tire-Holders for Automobiles, of which the following is a specification.

This invention relates to tire holders of that class which are used for carrying extra tires for automobiles, to be readily available in case of emergency; and it has for its object to provide simple and improved means for carrying and supporting such extra tires in such a manner that they may be swung or moved to an out of the way position in order not to obstruct persons entering or descending from the automobile.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a side elevation of a portion of a car equipped with the improved tire holder. Fig. 2 is a perspective view showing the pivoted tire supporting member, detached. Fig. 3 is a perspective detail view of the tire clamp used in connection with the invention. Fig. 4 is a perspective detail view of the staple used for the attachment of said clamp.

Corresponding parts in the several figures are denoted by like characters of reference.

The improved tire holder comprises a vertical post or upright 1 which is pivotally mounted for oscillation in suitable bearings 2—2 which latter may be applied in any suitable position upon an automobile or car adjacent to the entrance 3 to the automobile. In the drawing, one of the bearings is applied to the body 4 and the other to the step 5 of the car, but the particular arrangement of said bearings may be altered, and the construction of said bearings, which have been shown as consisting of ordinary sockets, may be modified within the scope of the invention.

The upright 1 is provided with a laterally extending arm 6; and said arm and upright are each provided with a tire supporting arm 7 having recesses 8 for the accommodation of one or more tires. The arms 7 are provided with slots 9 adjacent to the ends thereof for the reception of securing members such as straps 10 whereby the tire or tires may be secured in position upon the supporting arms. A separate member is provided which I call a tire clamp and the same being shown in detail in Fig. 3 of the drawings; said tire clamp 11 is provided with recesses 12 for the accommodation of one or more tires and with slots 13 for the passage of a fastening member such as a strap 14 whereby the clamp is secured in a suitable position upon the tire or tires which are supported in the recesses 8 of the arms 7; said tire clamp is provided with a hasp 15 having a staple engaging slot 16 and a pivoted hook 17, or other suitable means whereby said clamp may be detachably connected with an engaging member such as a staple 18 which is to be secured in a suitable position upon the dash board or body of the car.

The operation and advantages of this invention will be readily understood from the foregoing description taken in connection with the drawings hereto annexed. The tire supporting device is applied to the car in a suitable position adjacent to the entrance to the automobile, and the tire or tires supported thereby will thus normally obstruct said entrance but may, when desired, be swung like a door or gate to a non-obstructing position by disconnecting the hasp or fastening device connected with the clamping member 11 from the staple or engaging device 18.

Extra tires are frequently carried upon automobiles or touring cars in a position adjacent to the entrance to the machine for the reason that this is the most available position; but the entrance is thus obstructed and the car cannot conveniently be entered. By the present invention, the tire supporting member is pivotally mounted, and the tire may thus be moved to an unobstructing position, and it also serves to form a gate or door to the automobile.

Having thus fully described the invention, what I claim as new is:—

1. In a tire supporting device, a rod supported for oscillation, tire supporting members connected therewith, a tire clamp, and means for connecting said tire clamp with a fixed supporting point.

2. In a device of the class described, a rock shaft, bearings for the same, tire supporting members connected to the said rock shaft, a tire clamp having a hasp provided with a slot and a pivoted hook, and a staple suitably supported for engagement with the hasp.

3. In a device of the class described, a rod supported for oscillation and having a laterally extending arm, supporting members connected with said rod and arm and having tire receiving recesses and slots adjacent to the ends thereof, slot engaging means for securing tires in the recesses, a tire clamp having a hasp provided with a slot and a pivoted hook, and a suitably supported staple adapted to be engaged thereby.

In testimony whereof, I affix my signature in presence of two witnesses.

FREDERIC S. SUTHERGREEN.

Witnesses:
 HORACE S. PARKER,
 HENRY P. LEONARD.